2,722,550
Patented Nov. 1, 1955

2,722,550

PREPARATION OF N,N'-SUBSTITUTED UREAS

Charles S. Schollenberger, Cuyahoga Falls, Ohio, assignor to The B. F. Goodrich Company, New York, N. Y., a corporation of New York No Drawing. Application October 18, 1951,
Serial No. 252,001

6 Claims. (Cl. 260—553)

This invention relates to substituted ureas and more specifically pertains to the preparation of N,N'-substituted ureas.

I have discovered a new method for the preparation of N,N'-substituted ureas whereby unsymmetrical N,N'-substituted as well as symmetrical N,N'-substituted ureas can be readily and conveniently prepared. By this method N,N'-substituted ureas or thioureas are prepared by heating at reflux a carbamyl or thiocarbamyl halide in the presence of an alkaline material and water. This process can be illustrated by the following general overall reaction equation where sodium hydroxide is employed as illustrating the alkaline material

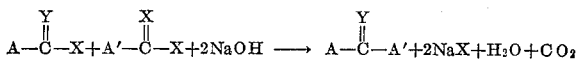

where X is a halogen, where Y is a chalcogen atom of one of the short periods of the periodic table, that is sulfur or oxygen, and where A and A' represent a disubstituted amino group. These disubstituted amino groups can be such groups as for example

where the R groups are the same or are different monovalent hydrocarbon groups; $R_1=N-$ where $R_1$ is a divalent hydrocarbon group, that is the nitrogen is a member of a cyclic ring containing only carbon atoms in addition to the ring nitrogen; B—N— where B is a divalent organic group which together with the amino nitrogen form a heterocyclic group containing in addition to the ring nitrogen and ring carbon atoms such hetero atoms as oxygen, sulfur and nitrogen. Where A and A' are the same, the urea or thiourea is symmetrical, and, of course, where A and A' are different the urea or thiourea is unsymmetrical.

The groups A and A' can be thought of as being the residual groups of secondary amines derived by the replacement of the hydrogen atom of the secondary amino group. In fact, one known method of preparing the carbamyl or thiocarbamyl halide reactant is to react equimolecular portions of a secondary amine with a carbonyl halide or a thiocarbonyl halide. There is formed with the carbamyl or thiocarbamyl halide one mole of hydrohalide by the removal of one halogen atom of the carbonyl halide used and the replaceable hydrogen atom of the secondary amine. Another method is to react a tertiary amine with carbonyl halide or thiocarbonyl halide in equimolecular proportions. In this case one of the three substituents on the amino nitrogen together with one halogen atom of the carbonyl or thiocarbonyl halide forms a new halide and the remaining

or

group attaches to the amino nitrogen. Regardless of the methods employed to prepare the N-substituted carbamyl or thiocarbamyl halide the A and A' group will hereinafter be referred to as being derived from a secondary amine by removal of the replaceable hydrogen.

The process of this invention is easily carried out and requires no special reaction equipment. A mixture containing N-substituted carbamyl or thiocarbamyl halide and an aqueous alkaline solution is heated to reflux. At this point an exothermic reaction takes place. In some cases the exothermic reaction gives off sufficient heat to maintain refluxing conditions until the reaction ceases and no further external heat need be applied. In other cases the heat of reaction is not sufficient to maintain reflux and external heating must be continued to cause the reaction to go to completion. Whether or not the specific reaction mixture will require external heat can be readily determined when the reaction mixture has been heated to cause refluxing.

Alkaline materials which can be employed in the process of this invention include in addition to sodium hydroxide hereinbefore employed in illustrating the general reaction such other alkali metal hydroxides as potassium hydroxide, lithium hydroxide, rubidium hydroxide, cesium hydroxide, and also include the alkaline earth hydroxides such as calcium hydroxide, magnesium hydroxide, barium hydroxide, and the like and such other alkaline materials such as sodium carbonate, sodium bicarbonate, potassium carbonate, and potassium bicarbonate.

The function of the alkaline material in this process is to react with the hydrohalide formed in situ by the hydrolysis of the carbamyl halide reacting with water. Since the carbamyl halide is an acyl halide, that is, the acid halide of a carbamic acid, it reacts quite readily with water. In fact, when a carbamyl halide is added to water and the mixture is heated slightly, hydrolysis takes place. However, the resulting carbamic acid is unstable and decomposes to a secondary amine hydrohalide and carbon dioxide. When an alkaline material is present, this takes up the hydrohalide formed in situ by reacting with the hydrohalide thereby promoting the desired reaction between the free amine and the carbamyl halide.

The following specific examples illustrate the process of this invention.

EXAMPLE 1

To a reactor connected to a reflux condenser there was added 20 parts by weight of N,N-diethyl carbamyl chloride and 66.5 parts by weight of 10% by weight aqueous sodium hydroxide. This mixture was heated until refluxing began. No apparent reaction took place until reflux had started. At this point the externally applied heat was removed, but refluxing continued indicating that an exothermic reaction was taking place. This spontaneous reaction continued for about ten minutes and then refluxing ceased. The reaction mixture was steam distilled and the characteristic urea odor was noted. The two layers resulting from the steam distillation were separated. The lower layer, the aqueous layer, was saturated with potassium carbonate to salt out the product therein. The upper layer and that which salted out were combined and dried over anhydrous magnesium sulfate. In this manner 8 parts of a dry liquid product were obtained. The dry liquid product had a boiling point of 86°–87° C. at a reduced pressure of 8 mm. Hg. The product was identified as tetraethyl urea.

EXAMPLE 2

To a reactor as described in Example 1 there was added 2.0 parts by weight of N,N-di(n-butyl) carbamyl chloride, 5.5 parts by weight of a 10% aqueous solution of sodium hydroxide and 5 parts by weight of water. This mixture was heated until refluxing began. External heat was removed, but reflux ceased. External heat was applied and refluxing was maintained for about one hour. The organic layer in the reactor was separated from the aqueous layer, diluted with ether, dried over anhydrous magnesium sulfate, filtered and then the ether was evaporated off. The remaining liquid organic material had a boiling point of 125° to 130° C. at a reduced pressure of 1.0 mm. Hg. There was recovered 0.92 part of the vacuum distilled product which was identified as tetra (n-butyl) urea.

In the table which follows, there is tabulated the starting materials employed to prepare various other N,N'-substituted ureas and thioureas.

Table

| Example Number | Reactants Carbamyl Halide | Hydrolysis Agent in Aqueous Solution | N,N'-Substituted Urea Product |
|---|---|---|---|
| 3 | 2-diphenyl carbamyl bromide | KOH | Tetraphenyl urea. |
| 4 | diphenyl carbamyl chloride and dimethyl carbamyl chloride. | $NaHCO_3$ | N-diphenyl N'-dimethyl urea. |
| 5 | 2-dimethyl thiocarbamyl chloride | $Na_2CO_3$ | Tetramethyl thiourea. |
| 6 | 2-morpholinyl carbamyl chloride | NaOH | $O\!\!<\!\!\genfrac{}{}{0pt}{}{CH_2-CH_2}{CH_2-CH_2}\!\!>\!\!N-\overset{O}{\underset{\|}{C}}-N\!\!<\!\!\genfrac{}{}{0pt}{}{CH_2-CH_2}{CH_2-CH_2}\!\!>\!\!O$ |
| 7 | 2-pyrryl carbamyl chloride | $NaHCO_3$ | $\genfrac{}{}{0pt}{}{CH=CH}{CH_2=CH_2}\!\!>\!\!N-\overset{O}{\underset{\|}{C}}-N\!\!<\!\!\genfrac{}{}{0pt}{}{CH=CH}{CH=CH}$ |
| 8 | 2-pyridyl carbamyl chloride | NaOH | $CH_2\!\!<\!\!\genfrac{}{}{0pt}{}{CH_2-CH_2}{CH_2-CH_2}\!\!>\!\!N-\overset{O}{\underset{\|}{C}}-N\!\!<\!\!\genfrac{}{}{0pt}{}{CH_2-CH_2}{CH_2-CH_2}\!\!>\!\!CH_2$ |
| 9 | 2-dicyclohexyl carbamyl chloride | KOH | Tetra cyclohexyl urea. |
| 10 | 2-dicyclohexyl thiocarbamyl chloride. | $Ca(OH)_2$ | Tetra cyclohexyl thiourea. |
| 11 | 2-benzyl phenyl carbamyl chloride | NaOH | N,N'-bis(benzyl phenyl) urea. |
| 12 | 2-N-allyl N-propyl carbamyl chloride. | NaOH | N,N'-bis (allyl propyl) urea. |
| 13 | dicyclohexyl carbamyl chloride and diphenyl carbamyl chloride. | NaOH | N-dicyclohexyl N'-diphenyl urea. |

Any of the other carbamyl halides of the classes hereinbefore defined can be employed as reactants in place of those used in the specific examples. The specific proportion of the carbamyl halide employed in the process is not critical. In fact the quantity of this reactant to be employed can be varied as desired according to the amount of substituted urea required. Also, as hereinbefore stated, any basic material which will react with the hydrohalide formed as a by-product to form a halide salt can be employed in the process of this invention. The precise proportion of the alkaline material used can be varied as desired, but there should always be a sufficient amount present to react with all of the hydrohalide resulting from the hydrolysis of the acid chloride.

Having disclosed my invention by means of specific examples, I do not thereby desire or intend to limit myself solely thereto, for as hereinbefore stated, the precise proportions of the reactants can be varied and chemically equivalent materials can be employed without departing from the spirit and scope of this invention as defined in the appended claims.

I claim:

1. The method of preparing a tetra-alkyl urea which comprises heating to reflux a mixture containing an aqueous solution of sodium hydroxide and dialkyl carbamyl chloride where said hydroxide and carbamyl chloride are present in equimolecular proportions, maintaining the reactants at reflux temperature until a tetra-alkyl substituted urea is formed and recovering said urea.

2. The method of preparing tetraethyl urea which comprises heating to reflux equimolecular proportions of N-diethyl carbamyl chloride and sodium hydroxide in the presence of water, maintaining the reactants at reflux temperature until said urea is formed and recovering the urea.

3. The method of preparing tetra-(n-butyl) urea which comprises heating to reflux equimolecular portions of sodium hydroxide and N-di-(n-butyl) carbamyl chloride, in the presence of water, maintaining the reflux until said urea is formed and recovering the urea.

4. The method of preparing N,N'-tetra-substituted ureas and thioureas which comprises heating to reflux a mixture containing water, and a compound selected from the class consisting of N-organically disubstituted carbamyl halides and N-organically disubstituted thiocarbamyl halides, said compound having at least one N atom connected to two carbon atoms other than the carbonyl carbon, and at least one molecular equivalent based on the acid halide of an inorganic alkaline material selected from the class consisting of alkali metal hydroxides, carbonates, and bicarbonates and alkaline earth metal hydroxides, maintaining the reactants at reflux temperature until the tetra-substituted derivative is formed and recovering said derivative.

5. The method of preparing N,N'-tetra-substituted ureas and thioureas which comprises heating to reflux a mixture containing an aqueous solution of potassium hydroxide and a compound having the general formula $$A-\overset{Y}{\underset{\|}{C}}-X$$

wherein X represents a halogen atom, Y represents a chalcogen and A represents a disubstituted amine radical in which the disubstituted amine nitrogen is connected to two carbon atoms other than the carbonyl carbon, said hydroxide and said compound being present in substantially equimolar proportions, maintaining the reactants at reflux temperature until the tetra-substituted derivative is formed and recovering said derivative.

6. The method of preparing N,N'-tetra-substituted ureas and thioureas which comprises heating to reflux a mixture containing an aqueous solution of sodium hydroxide and a compound selected from the class consisting of N-

organically disubstituted carbamyl halides and N-organically disubstituted thiocarbamyl halides, said hydroxide and said compound being present in substantially equimolar proportions, maintaining the reactants at reflux temperature until a tetra-substituted derivative is formed and recovering said derivative.

References Cited in the file of this patent

UNITED STATES PATENTS

| | | |
|---|---|---|
| 1,393,597 | Albert | Oct. 11, 1921 |
| 1,437,027 | Tanberg | Nov. 28, 1922 |
| 1,477,087 | Tanberg | Dec. 11, 1923 |

FOREIGN PATENTS

| | | |
|---|---|---|
| 17,501 of 1914 | Great Britain | Feb. 11, 1915 |
| 211,245 | Great Britain | Feb. 21, 1924 |

OTHER REFERENCES

Wallach: Liebigs Ann., vol. 214, page 275 (1882).

Atkinson: J. Chem. Soc. (London), vol. 105, p. 1294 (1914).

Pearl et al.: J. Am. Chem. Soc., vol. 60, pp. 2478–80 (1938).